United States Patent Office 3,475,806
Patented Nov. 4, 1969

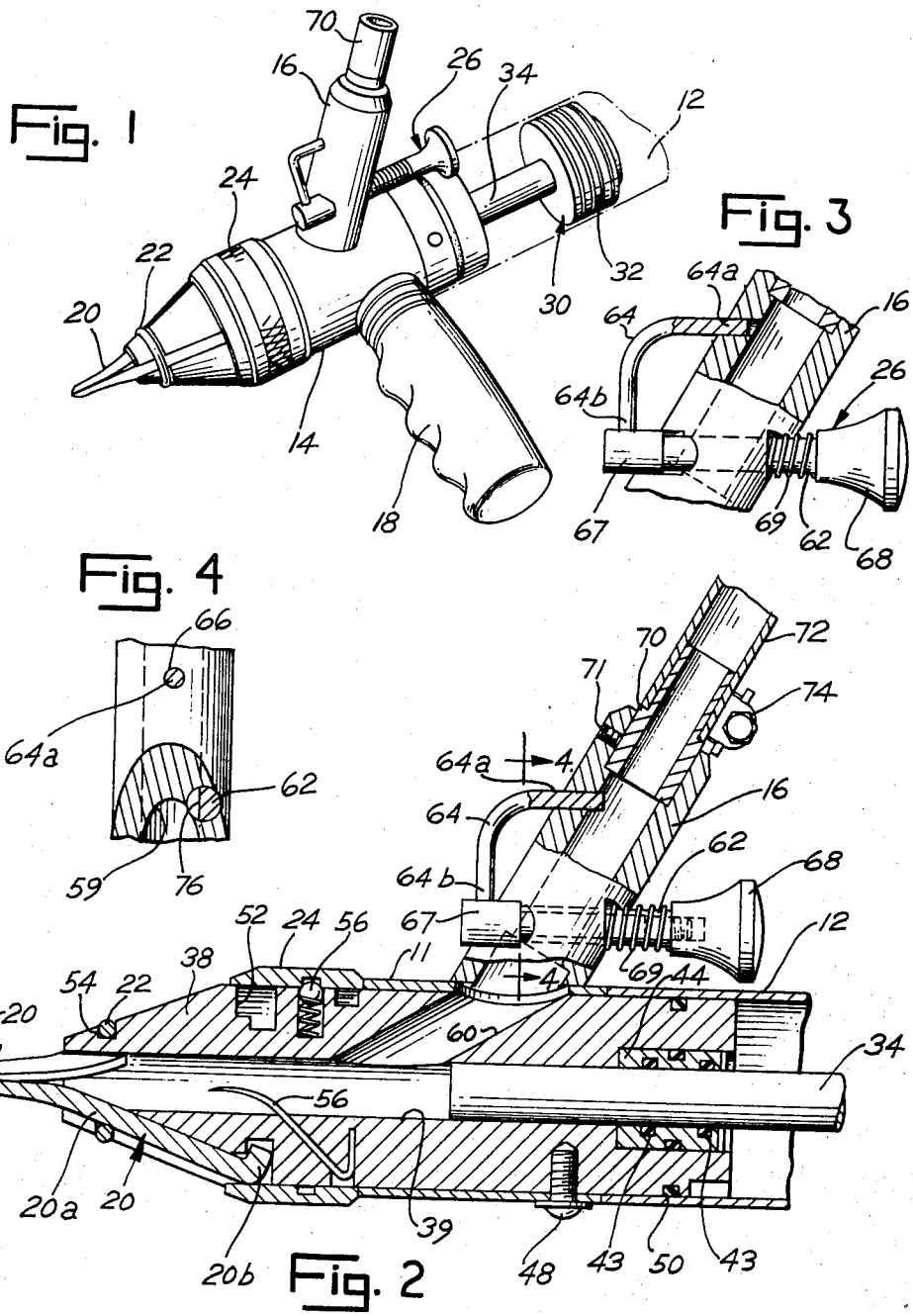

1

3,475,806
TIRE STUD GUN
Donald R. Center, Maineville, Ohio, assignor, by mesne assignments, to Saraband Properties, Inc., a corporation of Delaware
Filed Aug. 29, 1967, Ser. No. 664,062
Int. Cl. B23p 19/04; B23q 7/10
U.S. Cl. 29—212
4 Claims

ABSTRACT OF THE DISCLOSURE

A tire stud gun for inserting tire studs head-first into an opening in a tire tread, such gun including manually actuated plunger means mounted externally on the housing means closely adjacent to a hand grip thereon for controlling the feed of studs one at a time into the axial feed bore in the tire stud gun.

Brief summary of the invention

This invention relates to a tire stud gun and, more particularly, to an improved tire stud gun having manually actuated plunger means mounted on the housing thereof for controlling the movement of studs one at a time from a supply source into an axial feed bore in the housing of the tire stud gun.

The use of tire studs for increasing vehicle tire traction under adverse weather conditions, for example, ice and snow, has greatly increased in the past few years. Tire stud guns are used for inserting the studs into openings in tire treads. The openings may be drilled into the tire tread or molded into the tire tread during manufacture of the tire. A form of tire stud gun to which the present application may be applied is shown in Boggild Patent 3,258,835. Such tire stud gun comprises a cylindrical housing, a piston reciprocable in the housing, a base block at the back end of the gun, an actuator at the back end of the gun which is manually controlled to actuate the piston, and a head assembly at the front end of the gun into which a stud is delivered to the tire by each forward movement of the piston.

Secured to the cylindrical housing is an inlet member adapted to be connected to a source of tire studs. The tire studs enter the inlet member in end-to-end relationship, with the head end at each stud being first.

A stop rod is provided within the housing means for controlling the feed of stud from the inlet member into the axial bore in the cylindrical housing. The stop rod is operative in response to movement of the piston to permit the feed of the stud one at a time from the inlet member in the axial bore. In the event of jam-up of or damage to the stop rod, the tire stud gun is rendered inoperative. Operation of the piston and feeding of studs from the gun may be impeded. Since the stop rod is within the housing, repair and maintenance thereof are relatively difficult.

An object of the present invention is to provide an improved tire stud gun having plunger means mounted externally on the tire stud gun adjacent the forward hand grip means for controlling the feed of tire studs from a source of studs into the axial feed bore within the tire stud gun. Other objects and advantages of the present invention will become more apparent hereinafter.

Brief description of the drawing

The attached drawing illustrates a presently preferred embodiment of the invention in which:

2

FIG. 1 is a perspective view of a tire stud gun embodying the present invention, with a portion of the tire stud gun broken away for clarity;

FIG. 2 is a longitudinal cross-sectional view of the tire stud gun of FIG. 1 illustrating more clearly the plunger means of the present invention, such plunger means being in a position permitting passage of a tire stud through the inlet member;

FIG. 3 is a partial cross-sectional view similar to FIG. 2 illustrating the plunger means in a position interfering with the bore within the inlet member so as to prevent feed of a tire stud into the axial bore in the tire stud gun; and FIG. 4 is a detail sectional view of the tire stud gun taken generally along line 4—4 of FIG. 2.

Description of the preferred embodiment

Referring now to FIG. 1, there is illustrated a tire stud gun mechanism 10 embodying the present invention. The tire stud gun comprises a cylindrical housing 12 having a handle means (not shown) secured to the rear thereof and having a head 14 secured to the front thereof. An inlet member or inlet fitting 16 is suitably affixed to the head assembly 14. The inlet member 16 is adapted to be connected to a suitable source of tire studs, for example, a prepackaged unit wherein studs are retained in predetermined head first, end-to-end relationship or a feeder mechanism for feeding studs into a conduit connected to the inlet member in end-to-end head-first relationship. Secured to the head assembly 14 adjacent the forward end of gun 10 is a hand grip 18 for facilitating movement and handling of the tire stud gun 10 by an operator. The hand grip 18 extends from the housing means of gun 12 at generally right angles to the axis thereof and is offset about 90° from the axis of the inlet member 16.

Extending forwardly from and connected to the head assembly 14 are a plurality of opening jaws 20 adapted to be inserted into an opening in a tire tread for spreading the resilient wall defining the opening so as to permit insertion of a tire stud head first into the opening in the tire tread. An annular resilient closing ring 22 is disposed about the plurality of jaws 20 for biasing the jaw means inwardly toward one another. The ring 22 is adapted to be retained in a recess in the head assembly. The jaw means 20 are retained in the head assembly 14 by means of a collar 24 that is detachably secured to the head assembly 14 by ball detent means.

Carried on the inlet member 16 externally of the head assembly 14 is a manual plunger means 26 for controlling the passage of tire studs one at a time from the inlet member to an axial feed bore within the head assembly 14. The plunger means is so arranged on the inlet member 16 that it is adapted to be readily actuated by the thumb of the hand of the operator on the hand grip 18.

Referring now to FIGS. 2, 3 and 4, the construction and operation of the tire stud gun will be made more clear. Disposed within the cylindrical housing 12 of stud gun 10 and reciprocable therein is a double acting piston means 30 which includes a piston head 32 and a piston rod 34. Air introduced into the cylindrical housing acts upon the rear end of the piston head 32 for urging the piston head to the left as viewed in FIGS. 1 and 2. Similarly, air may be introduced into the cylindrical housing to act upon the front end of piston head 32 to urge the piston head to the right for return to its starting position. If desired, a spring may be disposed in the housing between the front face of the piston 32 and the rear of the block 38 within the cylindrical housing 12 for urging the piston 32 to its starting position in opposition to air pressure introduced into the air chamber defined at the rear end of the tire stud gun between the cylindrical housing 12 and the piston 32.

The piston rod or stem 34 is slidable within an axial bore 39 within the block 38 which is retained within the cylindrical housing 12. The piston rod stem 34 reciprocates within a bearing and seal arrangement 42 affixed suitably within the block 38. Suitable resilient O-rings 43 are provided for sealing between the piston rod 34 and the bearing block 44 and an O-ring 45 seals between the bearing block 44 and block 38. Suitable fastening means as for example, screw 48, is provided for connecting the annular sleeve portion 11 of the cylindrical housing 12 to the block 38. Similar fastening means (not shown) may be provided to retain the annular sleeve or cylindrical housing 12 in engagement with the block 38 and to secure the bearing block 44 in place within the block 38. A resilient O-ring 50 is provided between the block 38 and the housing 12.

Provided within the block 38 at the forward end thereof are a plurality of jaw means 20. As shown, there are three jaws 20 in the block. The jaws 20 each embody elongated generally L-shaped arms having a relatively long arm portion 20a and a relatively short arm angle portion 20b. The angle portion 20b is adapted to engage within the recessed area indicated generally by the numeral 52 within the block 38 so as to accommodate pivotal movement of the jaws. The jaws 20 are retained on the block 38 by means of collar 24 which is detachably secured to block 38 by ball-detent means 56. The annular resilient O-ring 22 is disposed and retained in the circumferential recess 54 in the block 38 for biasing the jaws 20 inwardly.

Also provided within the block 38 are a plurality of springs 56 for suitably positioning and orienting each stud within the bore 39 prior to discharge of the stud through the jaws 20. The cover sleeve or collar 24 is maintained in place by means of a ball-detent arrangement 56. The ball-detent arrangement is covered more fully in the copending application of Robert W. Houston Ser. No. 662,669 filed Aug. 23, 1967, and assigned to the same assignee as the present application.

The plunger means 26 is mounted on the inlet member 16 for controlling the passage of tire studs one at a time through the bore 59 defined in the inlet member 16. The bore 59 of the inlet member 16 communicates with a cooperating transverse bore 60 in the block 38 which in turn communicates with the axial feed bore 39 in block 38. The plunger means 26 comprises a rod or shaft 62 provided at one end with an enlarged end portion 67 for receiving one end 64b of a generally L-shaped member 64. The other end 64a of member 64 is adapted to extend through an opening 66 in the side of the inlet member 16 with a clearance fit to provide for movement into the bore 59 between a position interfering with the passage of tire studs, through the bore 59, as seen in FIG. 2, to a position permitting the passage of tire studs through bore 59, as seen in FIGURE 3.

Secured to the end of the rod 62 opposite from the enlarged portion 67 is a handle portion 68 which is adapted to be threadedly joined to the end of the rod 62. Concentrically carried on the rod 62 between a shoulder of the inlet member 16 and the front face at one end of the head member 68 is a spring 69 for biasing the head portion 68 outwardly away from the inlet member 16. The spring 69 normally functions to bias the end 64a of the angle member 64 of the plunger means into a position obstructing the flow of tire studs in the inlet member 16. Actuation of the plunger rod 26 forwardly or to the left as seen in FIG. 2 will cause the spring 69 to be compressed and will cause movement of the end 64a out of a position obstructing the passage of tire studs through the inlet member 16. Thus, by the present invention there is provided a simple manually actuated plunger means mounted externally of the tire stud gun for controlling the passage of studs one at a time through the inlet member 16 into the axial feed bore 39 within the block 38. Upon actuation of the piston 32, the rod 34 will force the tire studs one at a time and head first through feed bore 39, through spring 56 and jaws 20 into a prepared opening in a tire tread. As the rod 32 engages jaws 20, the jaws are spread to widen the opening for receiving the stud. When the piston is reciprocated rearwardly, the jaws 20 will close, and the tire stud gun may be removed.

The inlet member 16 may include a connector 70 secured to it by a set screw 71. A conduit 72 adapted to receive studs arranged in predetermined head-first end-to-end relationship is secured to the connector 70 by fastening means 74.

As seen in FIG. 4, the piston rod 62 moved is disposed in the wall of the inlet member 16 so as not to interfere with the tire studs passing through the bore 59. The interior side of the rod 62 is cut away or recessed as indicated at 76 to provide clearance with the bore 59 and studs passing therethrough. The end portion 64a of the plunger means 26 is adapted to move within the opening 66 in the wall of the inlet member 16. The opening 66 is larger in cross-sectional area than the end 64a so as to provide a clearance between the two members and thereby provide free movement of the end 64a within the opening 66.

The tire stud gun of the present invention is provided with simple manually actuated plunger means carried externally on the housing adjacent the hand grip and constructed and arranged so as to be readily operated by the hand of the operator on the hand grip. The plunger means function to regulate the flow of tire studs through the inlet member into the axial feed bore within the head assembly, from which bore the tire studs may be inserted into a tire tread upon actuation of the piston rod in the tire stud gun.

While I have described the preferred embodiment of my invention, it will be understood that this invention is not limited thereto but otherwise in the scope of the following claims:

What is claimed is:

1. In a tire stud gun for inserting tire studs head-first into openings in a tire tread, said gun including housing means having a feed bore therein for receiving studs from a supply source, hand grip means on the housing means, jaw means pivotally supported on said housing means for widening an opening in a tire tread into which a selected stud is to be inserted head-first, resilient means for biasing the jaw means toward one another, and piston means for forcing said selected studs from the feed bore into the opening in the tire tread, the improvement comprising manually actuated plunger means mounted externally on the housing means for controlling the passage of studs one at a time into the feed bore in the housing means, said plunger means including a member movable in an inlet bore in the housing means which communicates with the feed bore therein, said member being movable between a first position in the inlet bore blocking movement of tire studs through the inlet bore into the feed bore and a second position clearing the inlet bore for permitting movement of the tire studs one at a time through the inlet bore to the feed bore, said plunger means being adjacent the handgrip means and being operable by an operator's hand on the handgrip means.

2. A tire stud gun as in claim 1 wherein the plunger means are manually actuated in one direction, and a spring for biasing the plunger means in the opposite direction.

3. A tire stud gun as in claim 1 wherein the plunger means include a rod portion reciprocable in the housing means, the rod portion being manually actuated in one direction, and spring means for biasing the rod portion in an opposite direction.

4. A tire stud gun as in claim 3, wherein the member comprises an angle piece connected at one end to said rod portion for movement therewith, with the other end of the angle piece extending through an opening in a wall of the housing means into the inlet bore, the spring means being disposed about the rod portion between the housing means and an enlarged handle portion on one end of the rod portion.

References Cited

UNITED STATES PATENTS 3,258,835    7/1966    Boggild et al.
3,348,291    10/1967    Niedzwiecki.

THOMAS H. EAGER, Primary Examiner

U.S. Cl. X.R.

227—130